United States Patent
Qin

(10) Patent No.: US 12,526,418 B2
(45) Date of Patent: Jan. 13, 2026

(54) IMAGE COMPRESSION DEVICE AND IMAGE COMPRESSION METHOD

(71) Applicant: SigmaStar Technology Ltd., Fujian (CN)

(72) Inventor: Jing-Ru Qin, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 0 days.

(21) Appl. No.: 18/969,393

(22) Filed: Dec. 5, 2024

(65) Prior Publication Data

US 2025/0350727 A1 Nov. 13, 2025

(30) Foreign Application Priority Data

May 9, 2024 (CN) .......................... 202410572673.8

(51) Int. Cl.
| H04N 19/126 | (2014.01) |
| H04N 19/176 | (2014.01) |
| H04N 19/625 | (2014.01) |

(52) U.S. Cl.
CPC ......... *H04N 19/126* (2014.11); *H04N 19/176* (2014.11); *H04N 19/625* (2014.11)

(58) Field of Classification Search
CPC ... H04N 19/126; H04N 19/176; H04N 19/625
See application file for complete search history.

(56) References Cited

U.S. PATENT DOCUMENTS

| 5,042,069 A * | 8/1991 | Chhatwal | G10L 19/0212 704/229 |
| 8,294,605 B1 * | 10/2012 | Pagnanelli | H03M 3/30 341/145 |
| 9,276,602 B1 * | 3/2016 | Pagnanelli | H03M 1/1038 |
| 2007/0147518 A1 * | 6/2007 | Bessette | G10L 19/0212 375/243 |
| 2011/0140942 A1 * | 6/2011 | Pagnanelli | H03M 3/50 341/144 |
| 2012/0245947 A1 * | 9/2012 | Neuendorf | G10L 19/20 704/500 |
| 2015/0061911 A1 * | 3/2015 | Pagnanelli | H03M 3/30 341/144 |
| 2016/0182075 A1 * | 6/2016 | Devarajan | H03M 1/121 341/120 |
| 2017/0077945 A1 * | 3/2017 | Pagnanelli | H03F 3/45475 |
| 2020/0273472 A1 * | 8/2020 | Ravelli | G10L 19/032 |
| 2024/0420710 A1 * | 12/2024 | Helmrich | G10L 19/0204 |
| 2024/0420711 A1 * | 12/2024 | Helmrich | G10L 19/032 |
| 2024/0428812 A1 * | 12/2024 | Helmrich | G10L 21/038 |

* cited by examiner

*Primary Examiner* — James M Pontius
(74) *Attorney, Agent, or Firm* — Edell, Shapiro & Finnan, LLC

(57) ABSTRACT

An image compression device includes a discrete cosine transform (DCT) circuit, a quantization noise shaping (QNS) circuit, and an encoder circuit. The DCT circuit performs a DCT on original image data to generate first data. The QNS circuit performs QNS on block data in first data to determine, based on a first coefficient and a second coefficient of the block data, a QNS score of the first coefficient, and replace the first coefficient with the second coefficient when the QNS score is greater than zero so as to generate second data, wherein the second coefficient is obtained by decreasing an absolute value of the first coefficient. The encoder circuit encodes the second data to generate compressed image data.

10 Claims, 5 Drawing Sheets

IMAGE COMPRESSION DEVICE AND IMAGE COMPRESSION METHOD

This application claims the benefit of China application Serial No. CN202410572673.8, filed on May 9, 2024, the subject matter of which is incorporated herein by reference.

BACKGROUND OF THE INVENTION

Field of the Invention

The present application relates to an image compression device, and more particularly to an image compression device and method capable of enhancing an image compression rate based on a joint photographic experts group (JPEG) image standard.

Description of the Related Art

In the prior art, quantization tables are used for quantization of an image in response to different quantization factors, so as to control a compression rate of the image. However, data sizes of compressed images generated by using the same quantization factors are usually fixed. Therefore, in the prior art, a lower quantization factor is needed if an increased image compression rate is desired, and this leads significant degradation in image quality

SUMMARY OF THE INVENTION

In some embodiments, it is an object of the present application to provide an image compression device and method capable of enhancing an image compression rate based on a joint photographic experts group (JPEG) image standard, so as to improves the drawbacks of the prior art.

In some embodiments, the image compression circuit includes a discrete cosine transform (DCT) circuit, a quantization noise shaping (QNS) circuit, and an encoder circuit. The DCT circuit performs a DCT on original image data to generate first data. The QNS circuit performs QNS on block data in first data to determine, based on a first coefficient and a second coefficient of the block data, a QNS score of the first coefficient, and replace the first coefficient with the second coefficient when the QNS score is greater than zero so as to generate second data, wherein the second coefficient is obtained by decreasing an absolute value of the first coefficient. The encoder circuit encodes the second data to generate compressed image data.

In some embodiments, the image compression method includes operations of: performing a discrete cosine transform (DCT) on original image data to generate first data; performing quantization noise shaping (QNS) on block data in the first data to determine, based on a first coefficient and a second coefficient of the block data, a QNS score of the first coefficient, wherein the second coefficient is obtained by decreasing an absolute value of the first coefficient; replacing the first coefficient with the second coefficient when the QNS score is greater than zero to generate second data; and encoding the second data to generate compressed image data.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
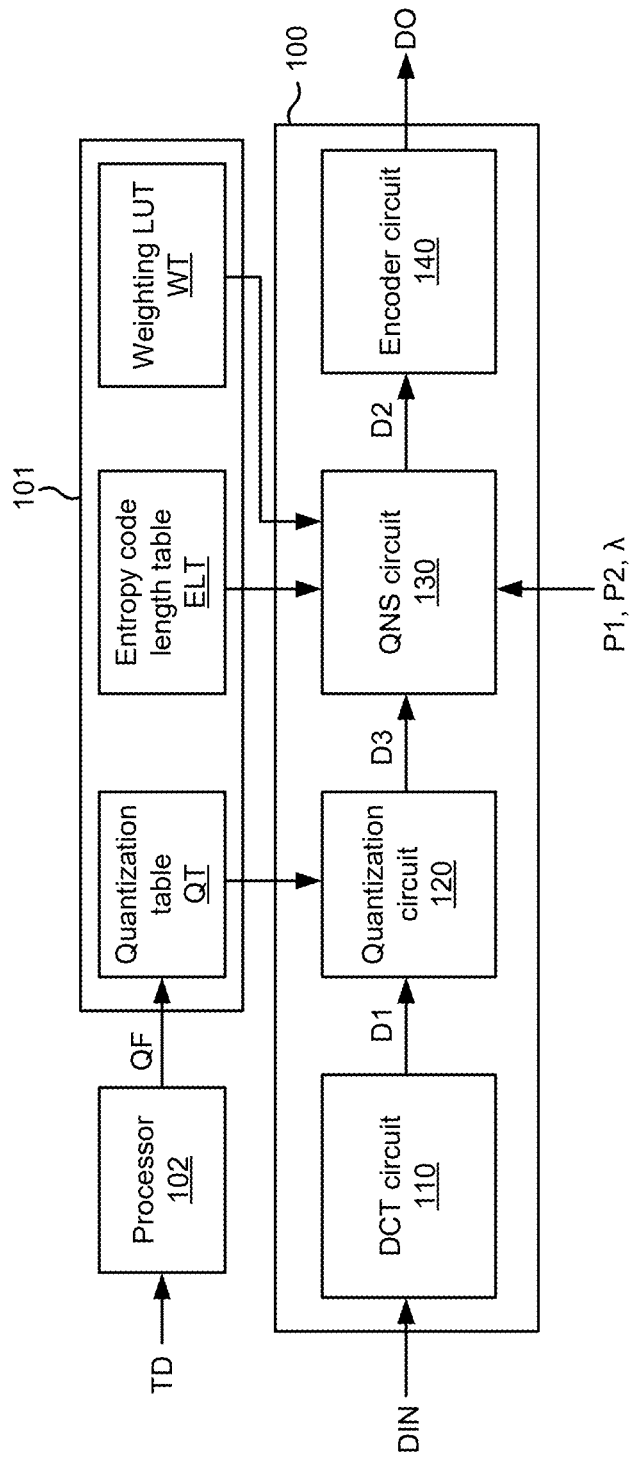
FIG. 1 is a schematic diagram of an image compression device according to some embodiments of the present application.

FIG. 1 shows a schematic diagram of an image compression device 100 according to some embodiments of the present application. The image compression device 100 may compress original image data DIN to generate compressed image data DO. In some embodiments, image compression performed by the image compression device 100 is based on a joint photographic experts group (JPEG) image standard; however, the present application is not limited to the example above.

The image compression device 100 includes a discrete cosine transform (DCT) circuit 110, a quantization circuit 120, a quantization noise shaping (QNS) circuit 130, and an encoder circuit 140. The DCT circuit 110 is configured to perform a DCT on the original image data DIN to generate data D1. In some embodiments, the data D1 may be a DCT coefficient. Related mathematical calculations of the DCT may be referred from descriptions of the JPEG image standard and related application publications, and are omitted herein. In some embodiments, the DCT circuit 110 may include several operation circuits (for example but not limited to, a multiplier and an adder) to perform DCT-related mathematical calculations.

The quantization circuit 120 may quantize the data D1 according to a quantization table QT to generate data D3. In some embodiments, the data D3 may be a quantized DCT coefficient. In some embodiments, the quantization table QT may be stored in a memory 101. In some embodiments, the quantization table QT may be generated offline and stored in advance in the memory 101. In some embodiments, the quantization table QT may be generated dynamically by a processor 102. For example, the processor 102 may receive a target data amount TD set by a user for the compressed image data DO, and determine a required quantization factor (Q-factor) QF according to the target data amount to accordingly generate the quantization table QT. In some embodiments, the quantization table QT is used to indicate correspondence between different quantization factors QF and different quantization matrices. The quantization circuit 120 may obtain a corresponding quantization matrix according the quantization table QT, and quantize the data D1 by using the quantization matrix to generate the data D3. In some embodiments, the quantization circuit 120 may be implemented by several multiplier circuits to perform matrix multiplication calculations; however, the present application is not limited to the example above.

The QNS circuit 130 performs QNS on block data in the data D1 (or D3) to determine, based on a first coefficient of the block data and a second coefficient associated with the first coefficient, a QNS score of the first coefficient, and replaces the first coefficient with the second coefficient when the QNS score is greater than zero, so as to generate data D2. In some embodiments, the second coefficient is obtained by decreasing an absolute value of the first coefficient. With the operation above, in the image data, the first coefficient which is larger can be replaced with the second coefficient which is smaller without overly affecting image quality, so as to downsize the data D1 (or the data D3) to the data D2 having a smaller data size, thereby improving the data compression rate. Operation details of the QNS circuit 130 are to be described with reference to FIG. 2A and FIG. 2C below.

In some embodiments, the QNS circuit 130 may perform QNS on the data D3 to generate the data D2. In some other embodiments, the QNS circuit 130 may perform QNS on the data D1 to generate the data D2. In other words, different from the configuration shown in FIG. 1, in this embodiment, the QNS circuit 130 is arranged between the DCT circuit 110 and the quantization circuit 120 and generates the data D2 according to the data D1, and the quantization circuit 120 quantizes the data D2 to generate another set of data to the encoder circuit 140. Therefore, the present application is not limited to the configuration shown in FIG. 1. For better understanding, the configuration in FIG. 1 is primarily described as an example in the description below.

The encoder circuit 140 encodes the data D2 to generate the compressed image data DO. In some embodiments, the encoder circuit 140 may perform entropy coding on the data D2 to generate the compressed image data DO. In some embodiments, the encoder circuit 140 may be implemented by a processing circuit capable of executing an entropy coding algorithm. In some embodiments, the entropy coding algorithm may include, for example but not limited to, the Huffman coding algorithm.

Figure 2A:
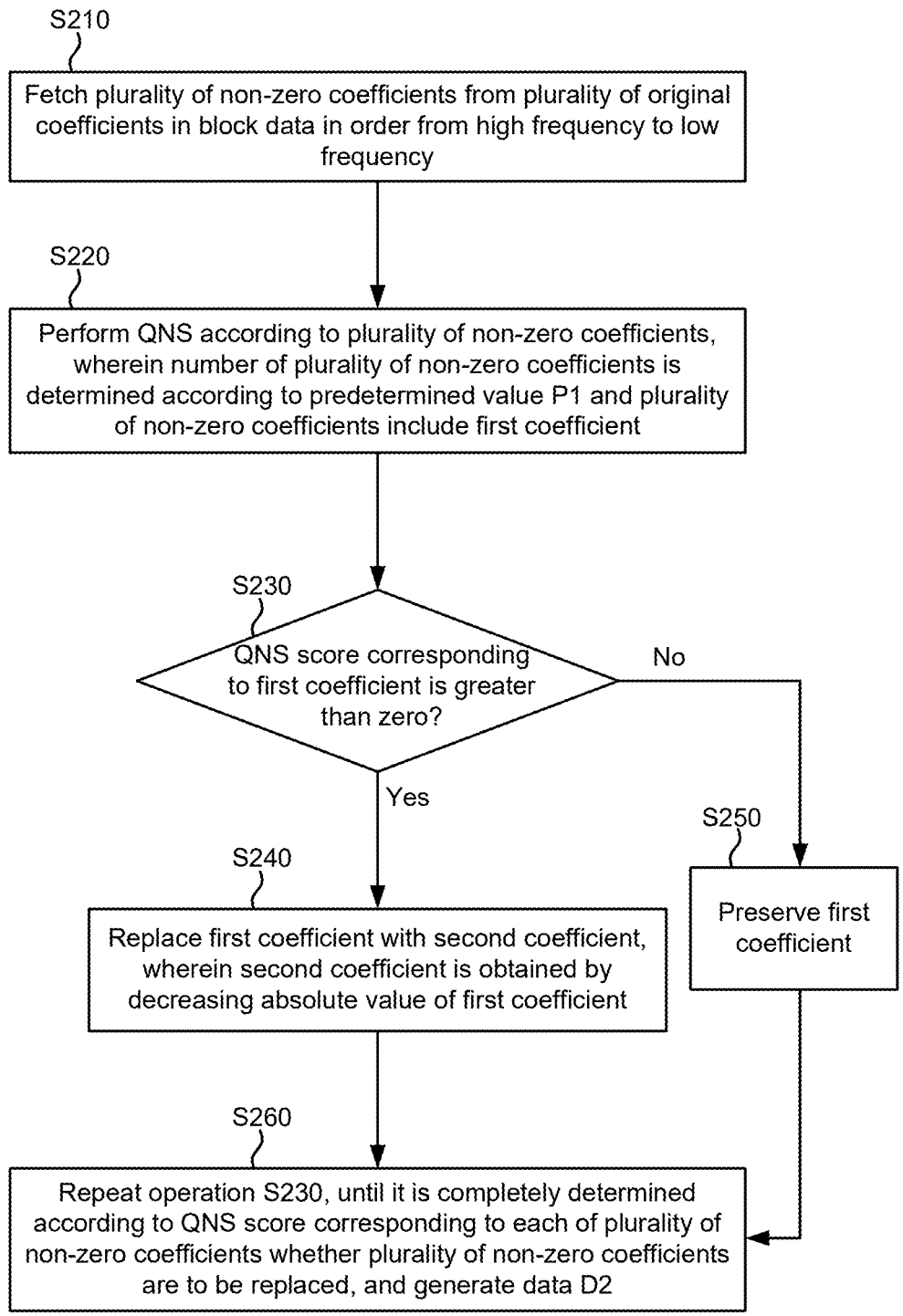
FIG. 2A is a flowchart of quantization noise shaping (QNS) operations performed by the QNS circuit in FIG. 1 according to some embodiments of the present application.

FIG. 2A shows a flowchart of QNS operations performed by the QNS circuit 130 in FIG. 1 according to some embodiments of the present application. In operation S210, a plurality of non-zero coefficients are fetched from a plurality of original coefficients of the block data according to an order from a high frequency to a low frequency. In operation S220, the QNS is performed on the plurality of non-zero coefficients, wherein the number of the plurality of non-zero coefficients is determined according to a predetermined value P1, and the plurality of non-zero coefficients include the first coefficient. In operation S230, it is determined whether a QNS score corresponding to the first coefficient is greater than zero. If so, operation S240 is performed. If not, operation S250 is performed. In operation S240, the first coefficient is replaced with the second coefficient, wherein the second coefficient is obtained by decreasing an absolute value of the first coefficient. In operation S250, the first coefficient is preserved. In operation S260, operation S230 is repeated until it is completely determined according to the QNS score corresponding to each of the plurality of non-zero coefficients whether the plurality of non-zero coefficients are to be replaced, and the data D2 is generated.

Figure 2B:
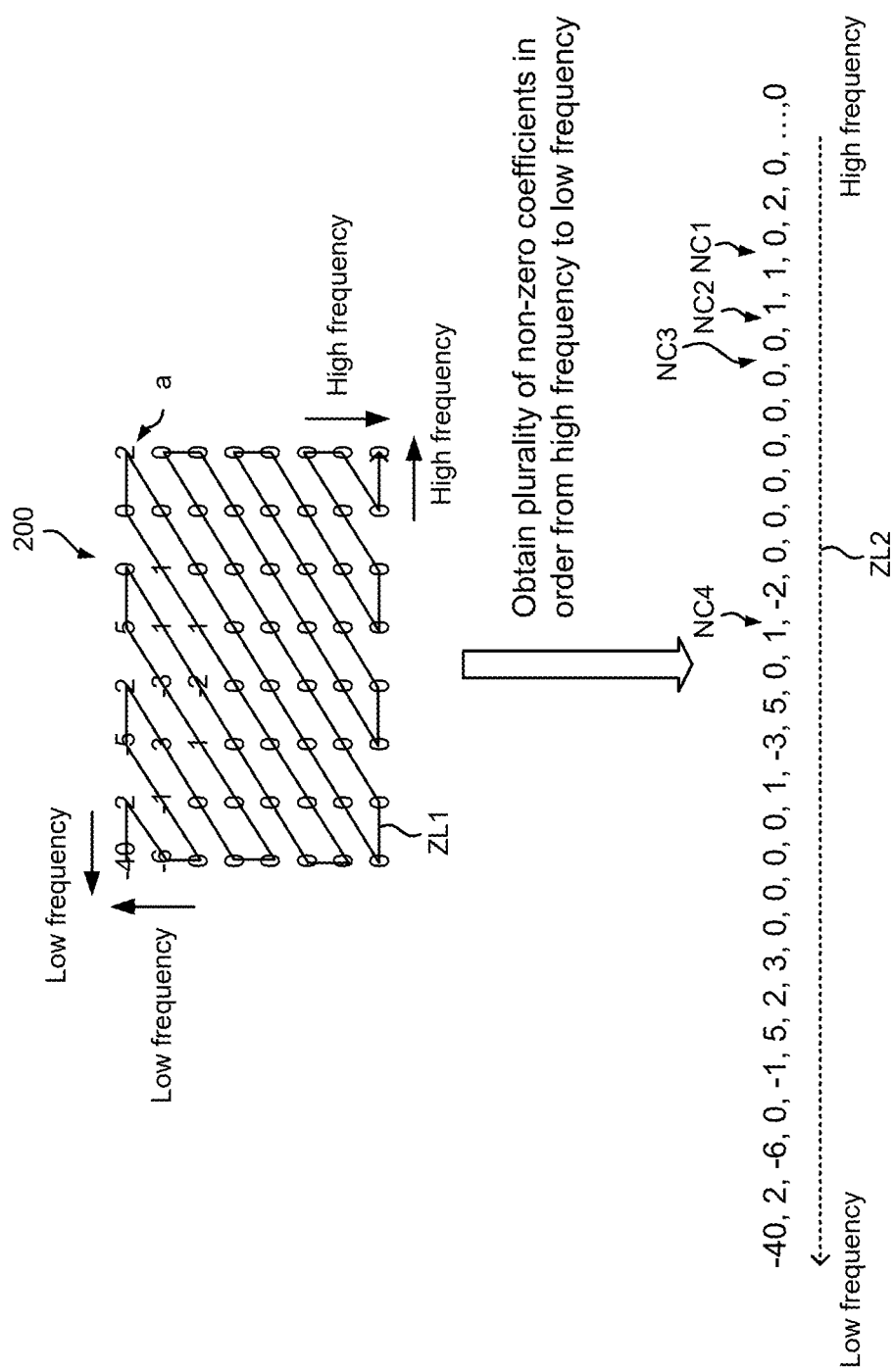
FIG. 2B is a schematic diagram of calculations of the first operation in FIG. 2A according to some embodiments of the present application.

To better describe the related operations in FIG. 2A, refer to FIG. 2B showing a schematic diagram of calculations of operation S210 in FIG. 2A according to some embodiments of the present application. Taking the JPEG image standard for example, a data value (for example, including a direct-current (DC) luminance value, an alternating-current (AC) luminance value, a DC chrominance value and an AC chrominance value) of data having undergone DCT and quantization is processed in a unit of block data, wherein each set of block data is formed by 8×8 pixels. Each set of block data includes multiple original coefficients (indicating values corresponding to the data values). For example, if information indicated by the block data is a DC luminance value, the original coefficient in the block data is a value of the DC luminance value.

As shown in FIG. 2B, block data 200 is a set of block data in the data D2 in FIG. 1 (in other embodiments, the block data 200 may also be a set of block data in the data D1), and includes an 8×8 matrix of 64 original coefficients. Based on the JPEG image standard, block data generated after DCT and quantization has a frequency that increases from an upper-left corner to a lower-right corner. In other words, the frequency of a signal corresponding to the coefficient on the upper-left of the matrix corresponding to the block data 200 is lower, and the frequency of a signal corresponding to the coefficient on the lower-right of the matrix corresponding to the block data 200 is higher. Based on the JPEG image standard, the QNS circuit 130 may obtain multiple original coefficients according to a zig-zag order (as indicated by the segment ZL1), wherein the original coefficients are sequentially arranged as −40, 2, −6, 0, −1, 5, 2, 3, 0, 0, 0, 0, 1, −3, 5, 0, 1, −2, 0, 0, 0, 0, 0, 0, 0, 1, 1, 0, 2, 0, . . . , 0.

Next, the QNS circuit 130 may obtain multiple non-zero coefficients from the original coefficients according to an order indicated by the segment ZL2 (that is, an order from a high frequency to a low frequency and opposite to the order indicated by the segment ZL1), wherein the number of the non-zero coefficients is set according to the predetermined value P1. In some embodiments, the predetermined value P1 may be set as 4; however, the present application is not limited to the example above. Accordingly, the QNS circuit 130 may obtain multiple non-zero coefficients NC1 to NC4 with values 2, 1, 1, and −2. In some embodiments, the predetermined value P1 may be stored in a register in the QNS circuit 130, and may be adjusted by a user according to actual requirements; however, the present application is not limited to the example above.

Figure 2C:
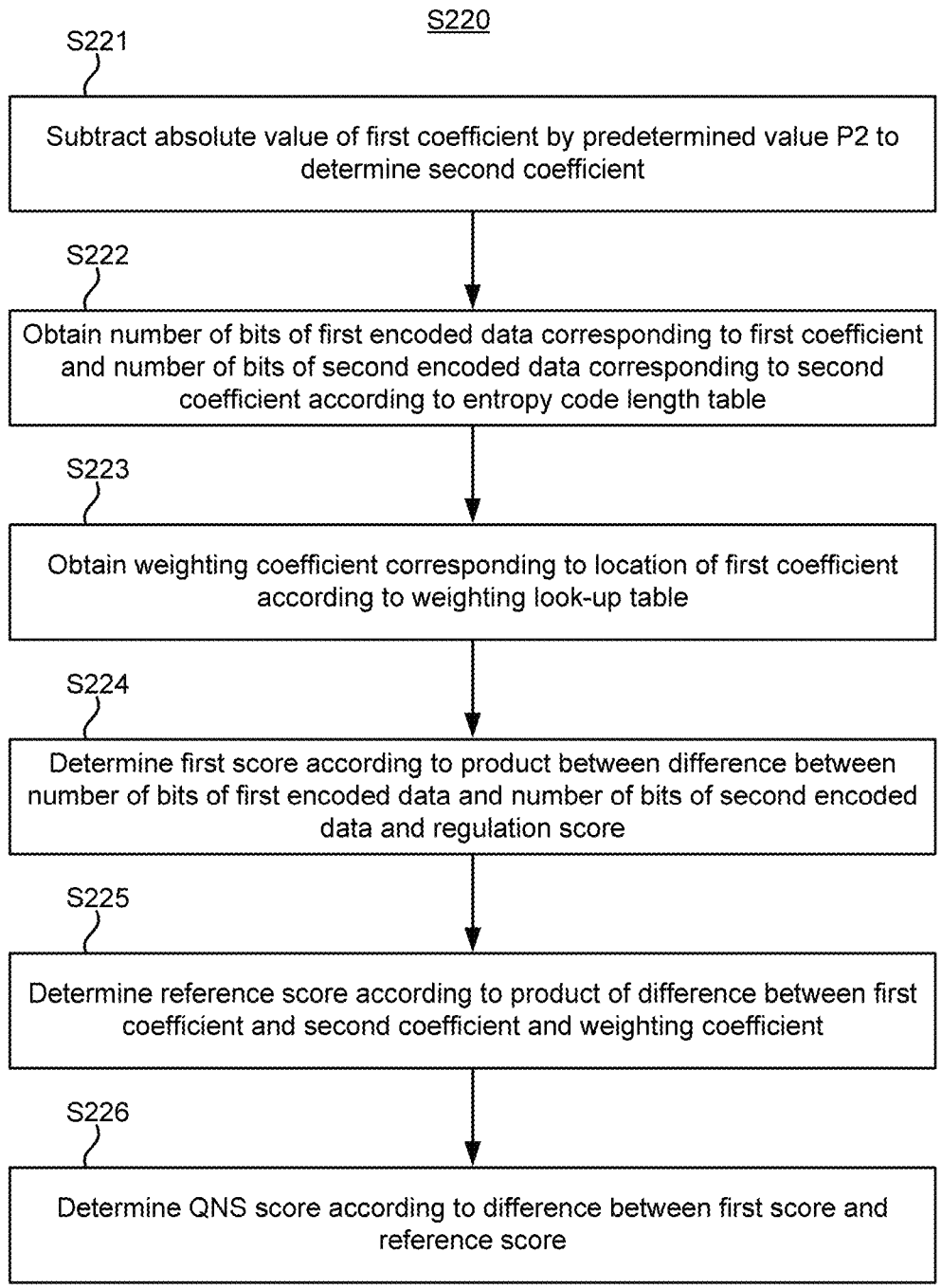
FIG. 2C is a flowchart of QNS operations performed on a non-zero coefficient in FIG. 2B by the QNS circuit in FIG. 1 according to some embodiments of the present application.

FIG. 2C shows a flowchart of QNS operations performed on a non-zero coefficient in FIG. 2B by the QNS circuit 130 in FIG. 1 according to some embodiments of the present application. In FIG. 2C, multiple operations S221 to S226 correspond to operation S220 in FIG. 2A.

In operation S221, an absolute value of a first coefficient is subtracted by a predetermined value P2 to generate a second coefficient. In some embodiments, the predetermined value P2 may be set as 1; however, the present application is not limited to the example above. For example, the first coefficient is 2, and the QNS circuit 130 may subtract the absolute value of the first coefficient by 1 to determine the second coefficient as 1. In some embodiments, the predetermined value P2 may be stored in a register in the QNS circuit 130, and may be adjusted by a user according to actual requirements; however, the present application is not limited to the example above.

In operation S222, the number of bits of first encoded data corresponding to the first coefficient and the number of bits of second encoded data corresponding to the second coefficient are obtained according to an entropy code length table. In some embodiments, the memory 101 in FIG. 1 further stores an entropy code length table ELT which indicates data lengths (that is, number of bits of encoded data) after entropy encoding of multiple original coefficients in the block data 200. For example, based on the JPEG image standard, the entropy coding algorithm includes performing differential pulse code modulation on DC coefficients, and performing run-length coding and the Huffman coding algorithm on AC coefficients. In order to save a calculation amount and quickly obtain required information, the entropy code length table ELT may be generated offline by the algorithms above, and the entropy code length table ELT is stored in advance in the memory 101, so as to record correspondence between multiple coefficients and total data lengths before and after encoding. Taking the entropy code length table ELT indicating the DC luminance value for example, such table may be Table-1 below:

TABLE 1

| Data before encoding (Hexadecimal) | (Corresponding to binary data) | Corresponding code(s) | Data after encoding | Encoded data Number of bits |
|---|---|---|---|---|
| 0x00 | 0 | 00 | 00 | 2 |
| 0x01 | 1 | 01 | 0101 (010 + 1) | 4 |
| 0x02 | 10 | 02 | 01110 (011 + 10) | 5 |
| 0x03 | 11 | 02 | 01111 (011 + 11) | 5 |
| 0x04 | 100 | 03 | 100100 (100 + 100) | 6 |
| . | . | . | . | . |
| . | . | . | . | . |
| . | . | . | . | . |
| 0x1f | 11111 | 05 | 11011111 (110 + 11111) | 8 |
| . | . | . | . | . |
| . | . | . | . | . |
| . | . | . | . | . |

It should be noted that, the entropy code length table ELT of luminance values above is obtained by encoding according to a default luminance AD Huffman code table in JPEG. As shown in Table-1, assuming that data before encoding is 0x03, since 0x03 corresponds to binary data 11 (occupying 2 bits), the corresponding code is 02. According to rules of the Huffman coding algorithm, the corresponding code is encoded into 011 (occupying 3 bits). Thus, the encoded data is 01111, and the number of bits of the encoded data is 5. Similarly, the correspondence between the remaining fields in Table-1 can be understood accordingly.

Thus, it can be understood that, by generating the entropy code length table ELT offline in advance, the QNS circuit 130 may use the entropy code length table ELT to quickly obtain the numbers of bits of encoded data corresponding to the multiple coefficients NC1 to NC4, so as to save the amount of calculation and accelerate the processing speed. For example, according to the entropy code length table ELT obtained based on the Huffman coding algorithm, the QNS circuit 130 can learn that the number of bits of encoded data corresponding to the non-zero coefficient NC1 (for example, 2) is 7, and the number of bits of encoded data corresponding to the second coefficient (for example, 1) is 5. It should be noted that Table-1 above is merely an example, and the present application is not limited to such example. It should be understood that, Table-1 takes DC luminance values as an example, and it could be conceived that information presented in the entropy code length table ELT should also be correspondingly adjusted according to the types of data values (for example, DC luminance values, DC chrominance values and AC chrominance values) to be processed.

Again referring to FIG. 2C, in operation S223, a weighting coefficient corresponding to a location of the first coefficient is obtained according to a look-up table (LUT). In some embodiments, the memory 101 in FIG. 1 further stores a weighting look-up table WT, which indicates weighting coefficients corresponding to locations of the multiple original coefficients in the block data 200. For example, information in the weighting look-up table WT may be represented as an 8×8 matrix below:

| 60 | 60 | 60 | 60 | 56 | 53 | 45 | 40 |
|---|---|---|---|---|---|---|---|
| 60 | 60 | 60 | 60 | 56 | 50 | 43 | 38 |
| 60 | 60 | 56 | 53 | 48 | 43 | 38 | 33 |
| 60 | 60 | 53 | 45 | 40 | 35 | 30 | 26 |
| 56 | 56 | 48 | 40 | 32 | 27 | 23 | 20 |
| 53 | 50 | 43 | 35 | 27 | 21 | 17 | 14 |
| 45 | 43 | 38 | 30 | 23 | 17 | 13 | 10 |
| 40 | 38 | 33 | 26 | 20 | 14 | 10 | 8 |

It is seen from the matrix above, if the frequency of a signal corresponding to a coefficient is lower, the corresponding weight coefficient is larger; if the frequency of a signal corresponding to a coefficient is lower, the corresponding weight coefficient is smaller. That is, the weighting coefficient on the upper-left of the matrix is set to be greater than that on the lower-right of the matrix. In some embodiments, the weighting look-up table WT may be generated offline in advance according to different application requirements (for example, requirements such as image quality and image compression rate) by means of circuit simulation or testing. In some embodiments, the weighting look-up table WT may be used to control the QNS circuit 130 to perform QNS in different degrees on coefficients in different frequencies. In FIG. 2B, the non-zero coefficient NC1 is the upper-rightmost coefficient in the block data 200. Thus, according to location correspondence, the QNS circuit 130 may obtain according to the upper-rightmost coefficient in the weighting look-up table WT that the weighting coefficient corresponding to this non-zero coefficient NC1 is 40.

In operation S224, a first score is determined according to a product of a difference between the number of bits of the first encoded data and the number of bits of the second encoded data and a regulation coefficient. For example, as described above, the number of bits of the first encoded data is 7, the number of bits of the second encoded data is 5, and so the QNS circuit 130 may determine that the difference between the two is 2. The QNS circuit 130 multiplies the difference of 2 by a regulation coefficient $\lambda$ to determine the first score. In some embodiments, the regulation coefficient $\lambda$ may be set to, for example but not limited to, 8. In this case, the QNS circuit 30 is able to determine that the first score corresponding to the non-zero coefficient NC1 is 16 (that is, 2×8=16). In some embodiments, the regulation coefficient λ may be stored in a register of the QNS circuit 130, and may be adjusted by a user according to actual requirements. In some embodiments, the regulation coefficient λ may be used to set a ratio between the number of bits and image quality of data to be down-sized; that is, the regulation coefficient λ may be used to set the image compression rate of QNS. In some embodiments, the regulation coefficient λ may be generated offline in advance by testing; however, the present application is not limited to the example above.

In operation S225, a reference score is determined according to a product of a difference between the first coefficient and the second coefficient and the weighting coefficient. For example, as described above, the first coefficient is 2, the second coefficient is 1, and the weighting coefficient corresponding to the location of the first coefficient is 40. In this case, the difference between the first coefficient and the second coefficient is 1, and the QNS circuit 130 may determine according to the product of this difference and the weighting coefficient that the reference score is 40.

In operation S226, the QNS score is determined according to a difference between the first score and the reference score. For example, as described above, the first score is 16, the reference score is 40, and so the QNS circuit 130 may determined that the difference between the two is −24 and accordingly determine that the QNS score of the non-zero coefficient NC1 is −24.

For example, in the example above, the QNS score of the non-zero coefficient NC1 is −24, and the QNS circuit 130 may accordingly determine that the QNS score of the non-zero coefficient NC1 is not greater than zero (that is, operation S230 in FIG. 2A), meaning that the number of bits of data downsized after compression is lower than the loss in image quality. In this case, the QNS circuit 130 preserves the non-zero coefficient NC1 (that is, the non-zero coefficient is not replaced with the second coefficient, corresponding to operation S250 in FIG. 2A). In other examples, if the QNS score of the non-zero coefficient NC1 is greater than zero, it means that the number of bits of data downsized after compression is higher than the loss in image quality, and the QNS circuit 130 may then replace the non-zero coefficient NC1 with the second coefficient determined in operation S221 (that is, operation S240 in FIG. 2A).

Similarly, the QNS circuit 130 may sequentially process the remaining multiple non-zero coefficients NC2 to NC4 by the operation above, and output the processed block data 200 as the data D2 after completely processing the non-zero coefficients NC2 to NC4 (that is, operation S260 in FIG. 2A). Since QNS is performed with respect to high-frequency signals (that is, the multiple non-zero coefficients NC1 to NC4 identified above) to which the human eye is less sensitive, the loss in image quality accompanied with the downsized data amount corresponding to coefficients of high-frequency signals is less likely perceived by a user. As such, the image compression rate can be effectively enhanced under the same quantization factor without causing any significant loss in image quality. In an experimental example, in a scenario where roads are the main contents and quantization factors are set to 30, 50, 70 and 90, respectively, the compression rates may be increased by about 6.82%, 7.09%, 5.77% and 5.28%, and have approximate peak signal-to-noise ratios (SNR). It should be noted that numerical values above are merely examples, and the present application is not limited to such examples.

Figure 3:
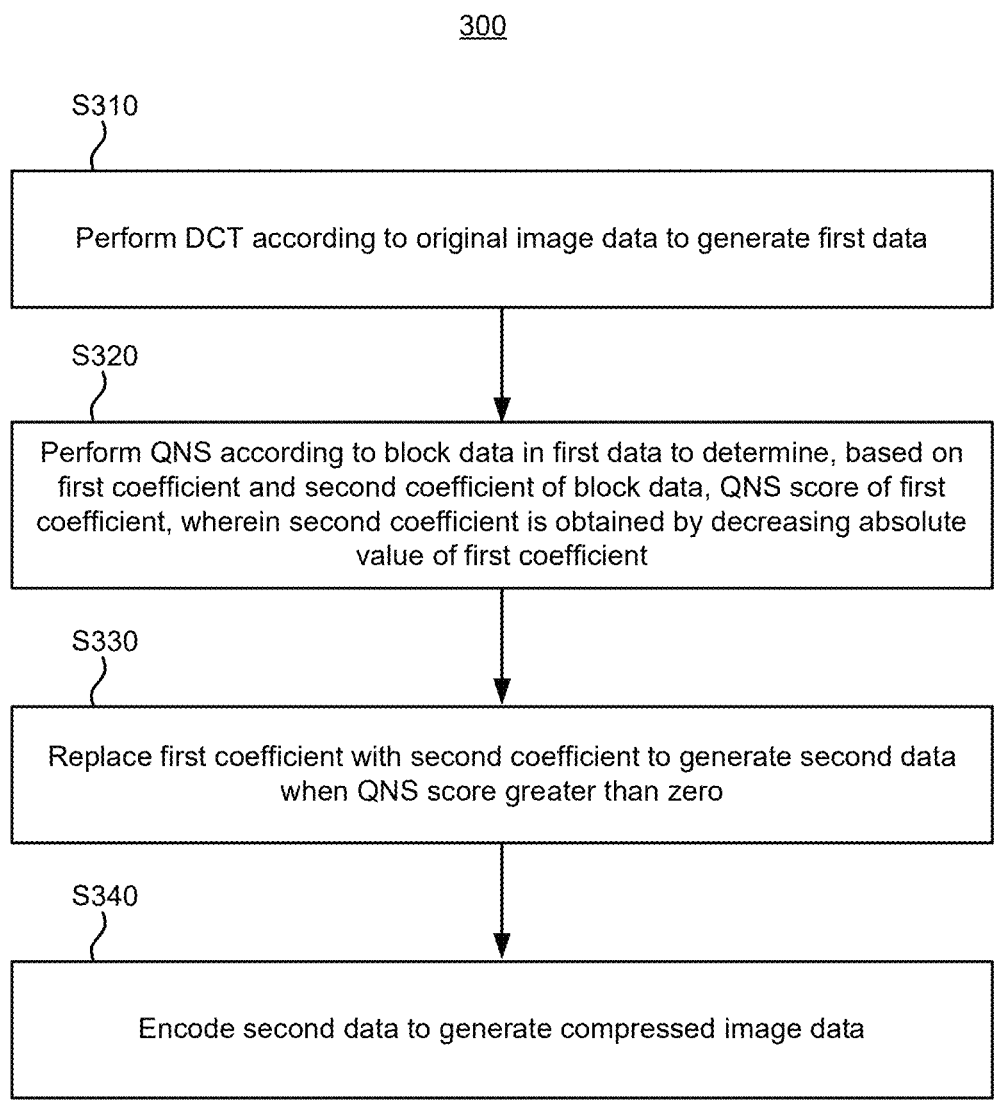
FIG. 3 is a flowchart of an image compression method according to some embodiments of the present application.

FIG. 3 shows a flowchart of an image compression method 300 according to some embodiments of the present application. In some embodiments, the image compression method 300 may be performed by the image compression device 100 in FIG. 1; however, the present application is not limited to the example above.

In operation S310, a discrete cosine transform (DCT) is performed on original image data to generate first data. In operation S320, quantization noise shaping (QNS) is performed on block data in the first data to determine, based on a first coefficient of the block data and a second coefficient associated with the first coefficient, a QNS score of the first coefficient, wherein the second coefficient is obtained by decreasing an absolute value of the first coefficient. In operation S330, when the QNS score is greater than zero, the first coefficient is replaced with the second coefficient to generate second data. In operation S340, the second data is encoded to generate compressed image data.

Details associated with the multiple operations of the image compression method 300 above can be referred from the details of the embodiments above, and are omitted herein. The multiple operations of the image compression method 300 are merely examples, and are not limited to being performed in the order specified in this example. Without departing from the operation means and ranges of the various embodiments of the present application, additions, replacements, substitutions or omissions may be made to the operations of the image compression method 300, or the operations may be performed in different orders. Alternatively, all or some of the operations in the image compression method 300 may be performed simultaneously.

In conclusion, the image compression device and the image compression method provided by some embodiments of the present application are capable of enhancing an image compression rate under the same quantization factors, and thus providing an additional mechanism for controlling an image compression rate other than using quantization factors, thereby providing substantial improvement in the field of image compression techniques.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. An image compression device, comprising:
   a discrete cosine transform (DCT) circuit, performing a DCT on original image data to generate first data;
   a quantization noise shaping (QNS) circuit, performing QNS on block data in the first data to determine, based on a first coefficient and a second coefficient of the block data, a QNS score of the first coefficient, and replacing the first coefficient with the second coefficient when the QNS score is greater than zero so as to generate second data, wherein the second coefficient is obtained by decreasing an absolute value of the first coefficient; and
   an encoder circuit, encoding the second data to generate compressed image data.

2. The image compression device according to claim 1, further comprising:

a quantization circuit, quantizing the first data according to a quantization table to generate third data,
wherein the QNS circuit performs the QNS according to the third data to generate the second data.

3. The image compression device according to claim 1, wherein the QNS circuit fetches a plurality of non-zero coefficients from a plurality of original coefficients in the block data according to an order from a high frequency to a low frequency, and performs the QNS according to the plurality of non-zero coefficients, the number of the plurality of non-zero coefficients are set according to a first predetermined value, and the plurality of non-zero coefficients comprise the first coefficient.

4. The image compression device according to claim 1, wherein the QNS circuit subtracts the absolute value of the first coefficient by a second predetermined value to generate the second coefficient.

5. The image encoding device according to claim 1, wherein the QNS circuit is configured to:
    obtain a number of bits of first encoded data corresponding to the first coefficient and a number of bits of second encoded data corresponding to the second coefficient according to an entropy code length table;
    obtain a weighting coefficient corresponding to the first coefficient according to a look-up table;
    determine a first score according to a product of a difference between the number of bits of the first encoded data and the number of bits of the second encoded data and a regulation coefficient;
    determine a reference score according to a product of a difference between the first coefficient and the second coefficient and the weighting coefficient; and
    determine the QNS score according to a difference between the first score and the reference score.

6. An image compression method, performed by an image compression device, the image compression method comprising:
    performing a discrete cosine transform (DCT) on original image data to generate first data;
    performing quantization noise shaping (QNS) on block data in the first data to determine, based on a first coefficient and a second coefficient of the block data, a QNS score of the first coefficient, wherein the second coefficient is obtained by decreasing an absolute value of the first coefficient;
    replacing the first coefficient with the second coefficient to generate second data when the QNS score is greater than zero; and
    encoding the second data to generate compressed image data.

7. The image compression method according to claim 6, further comprising:
    quantizing the first data according to a quantization table to generate third data,
    wherein the performing of the QNS on the block data to determine, based on the first coefficient and the second coefficient of the block data, the QNS score of the first coefficient comprises:
        performing the QNS according to the third data to generate the second data.

8. The image compression method according to claim 6, wherein the performing of the QNS on the block data to determine, based on the first coefficient and the second coefficient of the block data, the QNS score of the first coefficient comprises:
    fetching a plurality of non-zero coefficients from a plurality of original coefficients in the block data according to an order from a high frequency to a low frequency; and
    performing the QNS according to the plurality of non-zero coefficients,
    wherein the number of the plurality of non-zero coefficients is determined according to a first predetermined value, and the plurality of non-zero coefficients comprise the first coefficient.

9. The image compression method according to claim 6, wherein the performing of the QNS on the block data to determine, based on the first coefficient and the second coefficient of the block data, the QNS score of the first coefficient comprises:
    subtracting the absolute value of the first coefficient by a second predetermined value to generate the second coefficient.

10. The image compression method according to claim 6, wherein the performing of the QNS on the block data to determine, based on the first coefficient and the second coefficient of the block data, the QNS score of the first coefficient comprises:
    obtaining a number of bits of first encoded data corresponding to the first coefficient and a number of bits of second encoded data corresponding to the second coefficient according to an entropy code length table;
    obtaining a weighting coefficient corresponding to the first coefficient according to a look-up table;
    determining a first score according to a product of a difference between the number of bits of the first encoded data and the number of bits of the second encoded data and a regulation coefficient;
    determining a reference score according to a product of a difference between the first coefficient and the second coefficient and the weighting coefficient; and
    determining the QNS score according to a difference between the first score and the reference score.

* * * * *